April 7, 1959  O. E. VICE  2,880,515
DIAL TEST INDICATOR FOR LATHES
Filed Oct. 15, 1956  3 Sheets-Sheet 1
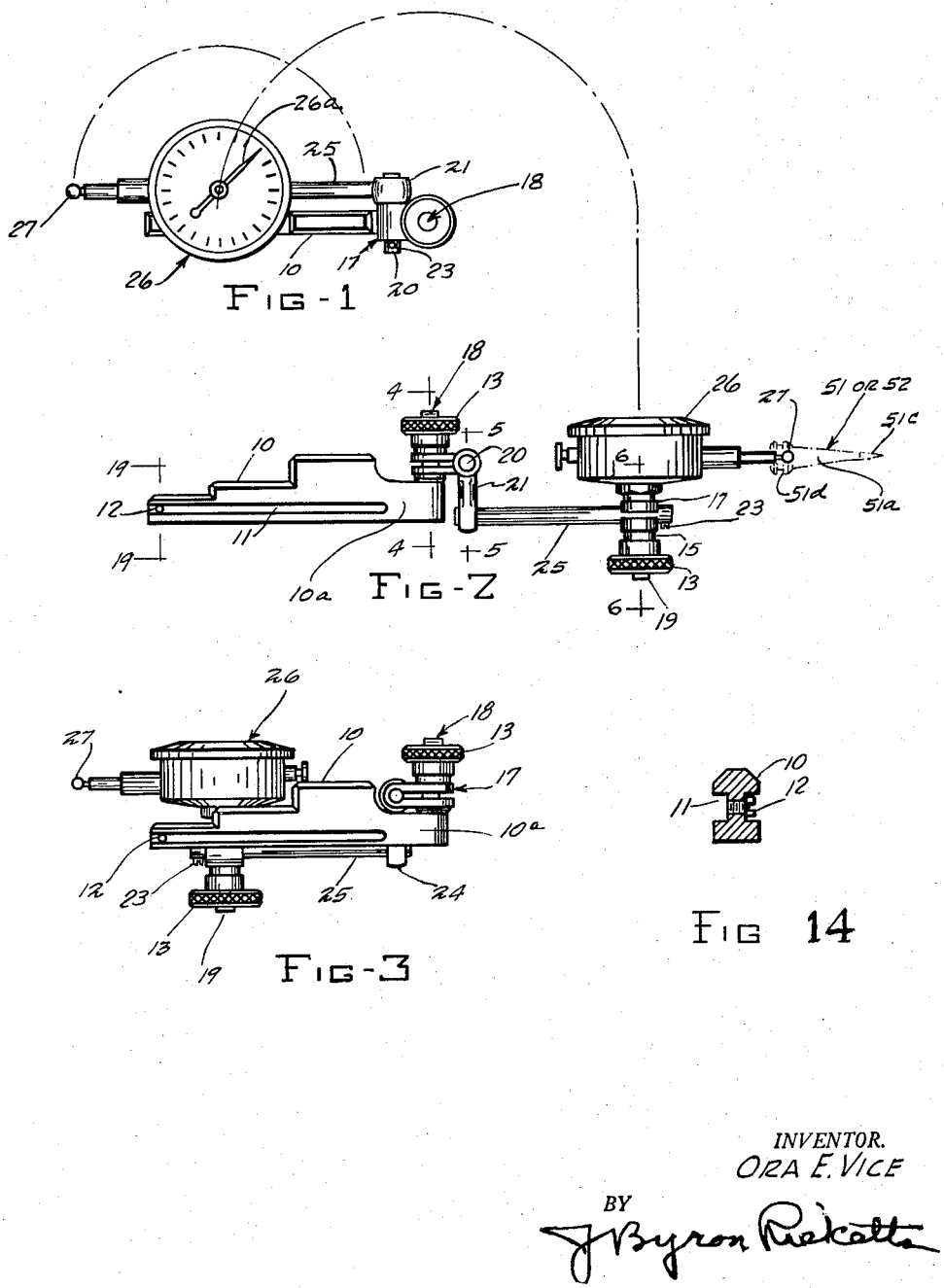
INVENTOR.
ORA E. VICE
BY
J. Byron Ricketts

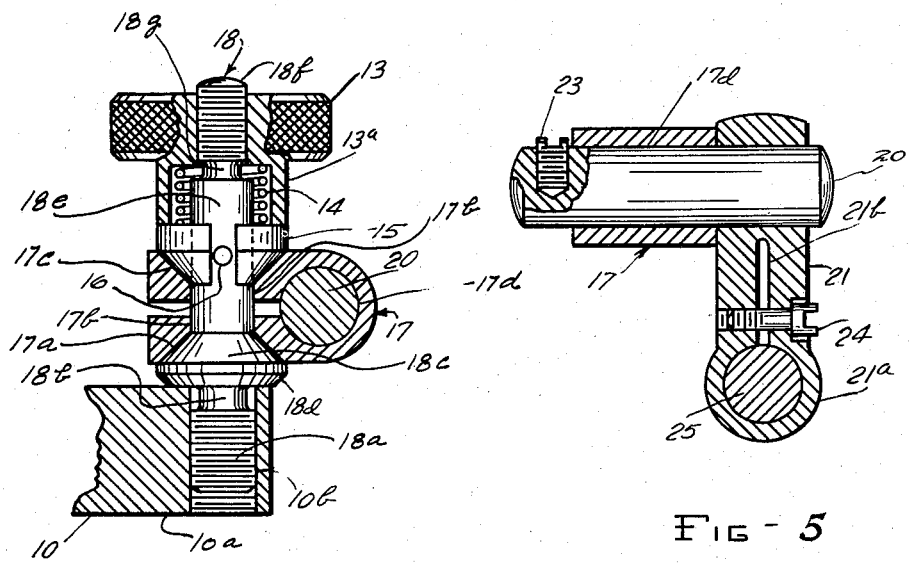
Fig-4
Fig-5
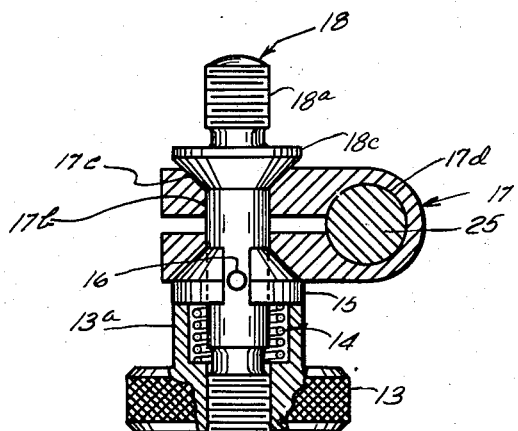
Fig-6
INVENTOR.
ORA E. VICE
BY
J Byron Ricketts

April 7, 1959     O. E. VICE     2,880,515
DIAL TEST INDICATOR FOR LATHES
Filed Oct. 15, 1956     3 Sheets-Sheet 3
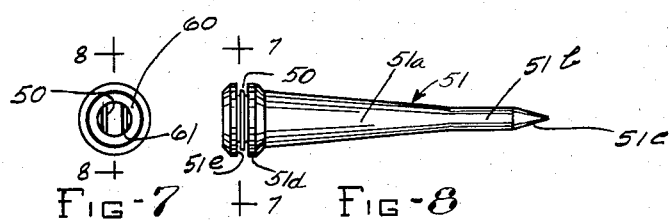
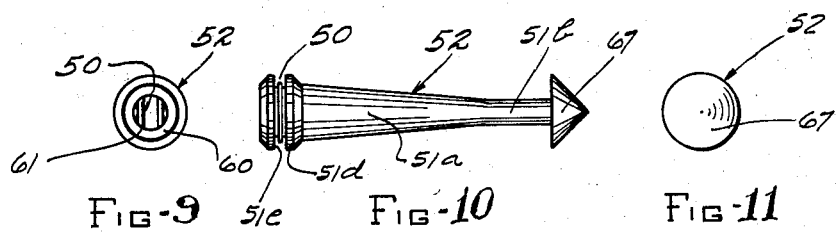
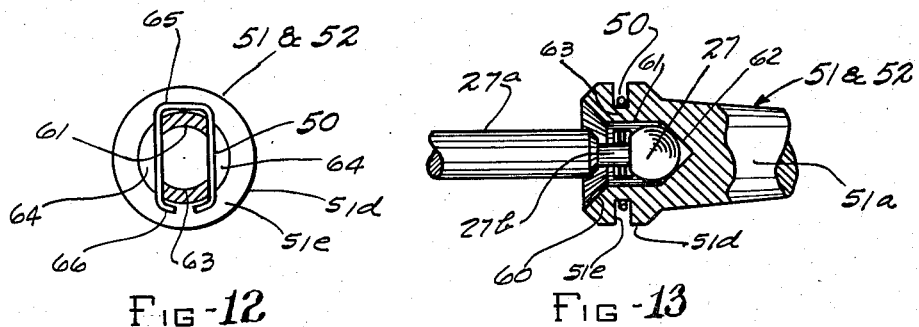
INVENTOR.
ORA E. VICE
BY J. Byron Ricketts : 2,880,515
Patented Apr. 7, 1959

2,880,515

DIAL TEST INDICATOR FOR LATHES

Ora E. Vice, Middletown, Ohio

Application October 15, 1956, Serial No. 616,076

5 Claims. (Cl. 33—172)

This invention relates generally to a dial set indicator and has for one of its objects the provision of a more easily and readily adjusted indicator by means of certain clamps.

Another object of the invention is the provision of a faster means of adjustment than has heretofore been provided for such indicators.

It is another object of the present invention to provide means for adjusting the indicator to any desired position by means of self-contained adjustable joints.

Still another object of the invention resides in the provision of a base which is adapted to be secured to a lathe tool post, a shaper tool post or a planer tool holder or the like.

Still another object of the invention resides in the provision of an indicator which is self-contained and wherein there are no additional parts to be assembled.

Still another object of the invention is to provide an indicator which may be folded and stored without disassembly.

Still another object of the invention to to provide a means to hold the indicator rigid after the desired position has been located by means of lock screws.

It is still another object of the present invention to provide clamp for mounting upon a stationary pivot, releasably and so that it can be secured in any position, a rotatably supported pivot which may extend transversely thereto.

For other objects and for a better understanding of the invention, reference may be had to the following detailed description taken in connection with the accompanying drawing, in which:

Figure 1 is a top plan view of a dial test indicator embodying the features of the present invention and shown in a folded position;

Fig. 2 is a side elevational view thereof but showing the indicator in the full length position;

Fig. 3 is a side elevational view showing the indicator in the folded position;

Fig. 4 is an enlarged longitudinal sectional view taken along the line 4—4 of Fig. 2;

Fig. 5 is an enlarged transverse sectional view taken along the line 5—5 of Fig. 2 indicating the angle swivel forming a part of the invention;

Fig. 6 is an enlarged transverse vertical sectional view taken along the line 6—6 of Fig. 2;

Fig. 7 is an end elevational view of a center wiggler adapted to be used with the first form of the invention;

Fig. 8 is a side elevational view of the center wiggler of Fig. 7;

Fig. 9 is an end elevational view of a bell wiggler adapted to be used with the first form of the invention;

Fig. 10 is a side elevational view of the bell wiggler of Fig. 9;

Fig. 11 is an end elevational view of the bell wiggler of Fig. 10 looking from the right end thereof;

Fig. 12 is an enlarged vertical sectional view taken along the line 17—17 of Fig. 8 and indicating the manner in which the snap spring is assembled onto the wiggler;

Fig. 13 is a fragmentary enlarged vertical sectional view taken along the line 18—18 of Fig. 7 and showing the same in operative position on the indicator; and Fig. 14 is a transverse vertical sectional view taken along the line 19—19 of Fig. 2.

Referring now more in detail to the drawing, and more particularly to Figs. 1 through 6, and 14, 10 represents a base member having a stepped upper surface and integrally formed at one end with the reduced extension 10a, substantially as illustrated. The base member 10 on opposite sides is provided with the laterally aligned, longitudinally extending grooves 11 to provide a means for clamping the base member to any tool holder. A keeper screw 12 is screw threaded through the base member 10 at the end of the groove 11 remote from the extension 10a and prevents the indicator from sliding away from the clamp, as will be obvious. The base member 10 is provided with the stepped upper surface to provide three different heights for fitting any tool holder.

As shown in Fig. 4, the reduced extension 10a of the base member 10 is provided with an internally threaded bore 10b into which is screwed the externally threaded lower end 18a of an indicator stud, indicated generally at 18. The indicator stud 18 includes the reduced smooth cylindrical neck 18b which is integrally formed in the upper end of the externally threaded portion 18a and is in turn integrally formed with the enlarged frusto conical portion 18c having a reversed frusto conical surface 18d at the lower end thereof and the undersurface of which abuts the top of the base member 10 surrounding the bore 10b. The frusto conical enlargement 18c is in turn integrally formed with the smooth cylindrical portion 18e which is connected to the upper externally threaded portion 18f by the reduced cylindrical neck 18g.

A friction clamp indicated generally at 17 of U-shaped vertical cross section is provided with the frusto conical bore 17a within which is received the frusto conical enlargement 18c of the indicator stud 18, vertically aligned cylindrical bores 17b in the upper and lower portions thereof which receive therethrough the smooth cylindrical portion 18e of the stud and an upper frusto conical bore 17c for a purpose which will hereinafter become clear. The central portion of the clamp is also provided with a smooth cylindrical bore 17d disposed at right angles to the bore 17b.

A frusto conical split friction collar 15 is slidably positioned on the smooth cylindrical portion 18e and is received within the bore 17c, a holder pin 16 being fixedly carried by the cylindrical portion 18e within the split portion of the collar 15 for preventing angular rotation of the collar relative to the stud. A locking nut 13 is screwed onto the externally threaded upper end of the stud 18f and is integrally formed with a hollow, depending sleeve 13a which encloses the cylindrical portion 18e and which rests on the cylindrical upper portion of the collar 15, a coil spring 14 being housed within the sleeve 13a with the upper end thereof bearing on the undersurface of the nut 13 and the lower end thereof bearing on the friction collar 15 whereby to urge the frusto conical portion of the latter downwardly into the frusto conical bore 17c of the friction clamp.

A swivel pin 20 is rotatably mounted within the bore 17d of the clamp 17 and is provided at one end with the keeper screw 23 which limits the displacement of the pin 20 through the clamp, as will be obvious. An angle swivel link 21 is fixedly mounted on the extended end of the pin 20 and is integrally formed at its lower end with the hollow cylindrical portion 21a and is provided with the longitudinal split portion 21b which communicates with the hollow cylindrical portion of the bore 21a, the bore being tightened by means of the clamping screw 24 screw threaded through the split portion 21b near the cylindrical portion 21a.

A connecting bar 25 is fixedly mounted at one end within the hollow cylindrical portion 21a of the link 21 and is provided at its other end with a second friction clamp 17 identical in construction with that previously described, the end of the connecting bar 25 being received within the central bore 17b thereof (Fig. 6). A second indicator stud 18 is positioned within the frusto conical bore 17c and cylindrical bore 17b of the friction clamp and includes the usual externally threaded upper end 18a, being identical in construction with the previous stud described. A second nut 13 is screwed onto the externally threaded lower end 18f of the stud and is integrally formed with the upwardly extending hollow cylindrical sleeve 13a which supports the cylindrical lower end of the frusto conical friction collar 15 having a split portion within which is positioned the retaining pin 16, a coil spring 14 being housed within the sleeve 13a and bearing at its upper end on the undersurface of the friction collar and at its lower end on the upper surface of the nut.

A dial indicator indicated generally at 26 is provided with an internally threaded central bore and is screwed downwardly onto the externally threaded upper end 18a, the dial indicator 20 including the indicator ball 27, in a manner well known to those skilled in the art.

In operation, the ball 27 and indicator 26 may be rotated from the inoperative position of Fig. 1 to the operative position of Fig. 2 about a vertical axis by loosening and then tightening the screw 13. The indicator and ball may further be adjusted by loosening and tightening the second nut 13 on the outer end of the bar 25 about a horizontal axis. Further adjustment may be effected about the pivot 20. This adjustment is faster than has heretofore been provided and is more easily and readily effected. This adjustment is effected to any desired position by means of the self-contained adjustable joints shown. The base, being stepped, can be secured to a lathe tool post, a shaper tool post or a planer tool holder or the like, and it will be noted that the indicator is self-contained and no additional parts need be added. It will also be apparent that there has been provided an indicator which can be folded and stored without disassembly and wherein means are provided for holding the indicator rigid after the desired position is located.

Referring now particularly to Figs. 7 through 13, there are shown a center wiggler and bell wiggler adapted to be used with the present invention. The center wiggler indicated generally at 51 includes the frusto conical portion 51a integrally formed at its smaller end with the cylindrical portion 51b which terminates in the point or conical tip 51c, the larger end of the wiggler being integrally formed with the cylindrical enlargement 51d having an annular groove 51e, the opposite ends of the cylindrical portion 51d being beveled. The larger end of the wiggler is provided with the frusto conical bore 60 which communicates at its inner end with the smooth cylindrical bore 61 which in turn terminates in the conical end portion 62, the cylindrical bore 61 in combination with the annular groove 51e defining the hollow cylindrical sleeve 63, the opposite sides of which are cut away as at 64 (Fig. 12) for a purpose which will hereinafter become clear, thus connecting the groove 51e with cylindrical bore 61.

As shown in Fig. 13, the ball 27 of the indicator 26 which is connected to the rod 27a by the reduced neck 27b is received within the conical portion 62 of the bore 61 whereupon the U-shaped snap spring 65 is inserted downwardly into the groove 51e onto the open opposite sides of the sleeve 61, the lower ends of the snap spring 65 being bent inwardly at 61 with the side portion engaging the reduced neck 27b between the rod 27a and the ball 27 to permit a universal movement of the wiggler and ready assembly with the indicator. This assembly is also shown in Fig. 2.

In operation, when the center of the work has been indicated by a center punch mark and the work has been mounted in the machine for turning, the wiggler 51 is then placed in position on the indicator ball 27 as described and as shown in Figs. 2 and 13. The point 51c of the wiggler is placed into the center punch mark on the work. If the work is not mounted accurately in the chuck, the wiggler 51 will turn in a circle and will, if the ball joint is anywhere off the axis of rotation move the indicator hand 26a (Fig. 1) showing how much the work is off center. The piece of work is then relocated and is again tried for center location.

Referring now particularly to Figs. 9, 10 and 11, 52 indicates generally a bell wiggler identical in construction with the center wiggler 51 except for the provision at the end of the reduced cylindrical portion 51b of an enlarged conical tip 67. In other respects the bell wiggler 52 is identical with the center wiggler 51, and like reference numerals identify like parts throughout the several views.

It should now be apparent that there has been provided a device for mounting upon a stationary pivot, releasably and so that it can be secured in any position, a rotatably supported pivot which may extend transversely thereto.

While various changes may be made in the detail construction, it shall be understood that such changes shall be within the spirit and scope of the present invention as defined by the appended claims.

What I claim as new and desire to protect by Letters Patent of the United States is:

1. A dial test indicator for lathes comprising a base member, means for mounting said base member on a tool holder or the like, a first stud fixedly mounted at one end of said base member in a substantially vertical position, first friction clamp means mounted on said first stud, a pivot pin carried by said friction clamp means and at substantially right angles to said stud, a pivot link connected to one end of said pivot pin, a substantially horizontal connecting bar having one end thereof connected to said pivot link and adapted to be rotated against said base member parallel thereto upon release of said first friction clamp means and to be retained there at by tightening said first friction clamp means, a dial test indicator, a substantially vertical second stud fixedly mounting said dial test indicator at the upper end thereof, second friction clamp means on said stud below said indicator, the other end of said connecting bar being mounted in said second friction clamp means, said indicator having a dial and indicator finger on its upper end and including a feeler rod in operative engagement therewith controlling the position of said indicator finger, said means for mounting said base member in a tool holder or the like comprising said base member being stepped whereby to accommodate tool holders of varying size, said base member on opposite sides being provided with longitudinally extending grooves aligned laterally, said grooves extending inwardly from the end of said base member remote from said stud, and a safety screw threaded through said base member within said grooves at their ends remote from said stud.

2. A dial test indicator for lathes comprising a base member, means for mounting said base member on a tool holder or the like, a first stud fixedly mounted at one end of said base member in a substantially vertical position, first friction clamp means mounted on said first stud, a pivot pin carried by said friction clamp means and at substantially right angles to said stud, a pivot link connected to one end of said pivot pin, a substantially horizontal connecting bar having one end thereof connected to said pivot link and adapted to be rotated against said base member parallel thereto upon release of said first friction clamp means and to be retained there at by tightening said first friction clamp means, a dial test indicator, a substantially vertical second stud fixedly mounting said dial test indicator at the upper end thereof, second friction clamp means on said stud below said indicator, the other end of said connecting bar being mounted in said second friction clamp means, said indicator having a dial and indicator finger on its upper end and including a feeler rod in operative engagement therewith controlling the position of said indicator finger, said first friction clamp means comprising said first stud at its lower end being formed with a frusto conical enlargement and having its smaller end disposed uppermost, a friction clamp of U-shaped vertical cross section having a hollow cylindrical bore at its central portion mounting said pivot pin therewithin, the lowermost side of said clamp having a frusto conical bore adapted to receive said enlargement therewithin, the sides of said clamp having reduced cylindrical bores aligned vertically with said frusto conical bore, the uppermost side of said clamp having a frusto conical bore, a split frusto conical friction collar positioned slidably on said stud above said enlargement, a pin connected to said stud within the slit portion of the said collar, the uppermost end of said stud being externally threaded, a nut screwed onto said externally threaded upper end, a hollow depending sleeve connected to said nut on the undersurface thereof having an open lower end abutting the upper end of said split collar, and a coil spring surrounding said stud within said sleeve with the lower end thereof bearing on said friction collar and the upper end on said nut.

3. A dial test indicator according to claim 2, said pivot pin being provided at one end with a set screw adapted to abut the end of the clamp, the other end of said pin extending beyond the other side of said clamp and fixedly mounting thereon said pivot link, said pivot link at the end thereof remote from said pivot pin being formed with a hollow cylindrical portion receiving said connecting bar therewithin, said link being split longitudinally and communicating with the central bore of said hollow cylindrical portion, and a lock screw screw threaded through the link transversely thereof whereby to tighten said hollow cylindrical portion about said connecting bar.

4. A dial test indicator for lathes comprising a base member, means for mounting said base member on a tool holder or the like, a first stud fixedly mounted at one end of said base member in a substantially vertical position, first friction clamp means mounted on said first stud, a pivot pin carried by said friction clamp means and at substantially right angles to said stud, a pivot link connected to one end of said pivot pin, a substantially horizontal connecting bar having one end thereof connected to said pivot link and adapted to be rotated against said base member parallel thereto upon release of said first friction clamp means and to be retained there at by tightening said first friction clamp means, a dial test indicator, a substantially vertical second stud fixedly mounting said dial test indicator at the upper end thereof, second friction clamp means on said stud below said indicator, the other end of said connecting bar being mounted in said second friction clamp means, said indicator having a dial and indicator finger on its upper end and including a feeler rod in operative engagement therewith controlling the position of said indicator finger, including an elongated central wiggler having a conical tip at one end and an enlarged cylindrical portion at the other end, said cylindrical portion having an annular groove, said cylindrical portion at the outer end thereof having a frusto conical bore communicating with the reduced cylindrical bore extending inwardly of said annular groove and terminating in a conical inner end portion, a ball connected to the end of said feeler rod by a reduced neck, said ball being receiving within said conical inner portion of said bore with the outer end of said feeler rod being receiving within said frusto conical bore,, said central cylindrical bore defining with said annular groove a reduced hollow cylindrical sleeve receiving said ball and reduced neck therewithin, said sleeve on opposite sides being cut away to connect said groove with said bore, and a U-shaped spring positioned within said groove with the sides of said spring engaging the neck on opposite sides thereof, the lower end of said spring being bent inwardly.

5. A dial test indicator according to claim 2, said second friction clamp means comprising said second stud below said indicator having a frusto conical enlargement, the lower end of said second stud being externally threaded, said stud intermediate said externally threaded lower end and frusto-conical enlargement having a smooth cylindrical portion, a frusto-conical split friction collar positioned on said smooth cylindrical portion, a pin mounted in said smooth cylindrical portion within the split portion of said friction collar, a nut screwed onto the externally threaded lower end of said second stud, said nut fixedly mounting an upwardly extending hollow cylindrical sleeve open at its upper end and supporting said friction collar, a coil spring sleeving said cylindrical portion within said sleeve with the upper end porting said friction collar, a coil spring sleeving said nut, and a friction clamp of U-shaped cross section having a central portion having a hollow cylindrical bore receiving the other end of said connecting bar therewithin, the sides of said friction clamp having an upper frusto-conical bore receiving said frusto conical enlargement therewithin, a lower frusto-conical bore receiving said friction collar therewithin and reduced cylindrical bores connecting said frusto-conical bores and receiving said smooth cylindrical portion therewithin.

References Cited in the file of this patent

UNITED STATES PATENTS

| | | |
|---|---|---|
| 1,334,915 | Low | Mar. 23, 1920 |
| 1,411,725 | Hill | Apr. 4, 1922 |
| 2,124,006 | Parker | July 19, 1938 |
| 2,371,451 | Larson | Mar. 13, 1945 |
| 2,528,201 | White | Oct. 31, 1950 |